March 21, 1933. E. R. BURTNETT 1,902,618
TRANSMISSION MECHANISM
Filed Jan. 14, 1931 3 Sheets-Sheet 1

INVENTOR.
Everett R. Burtnett

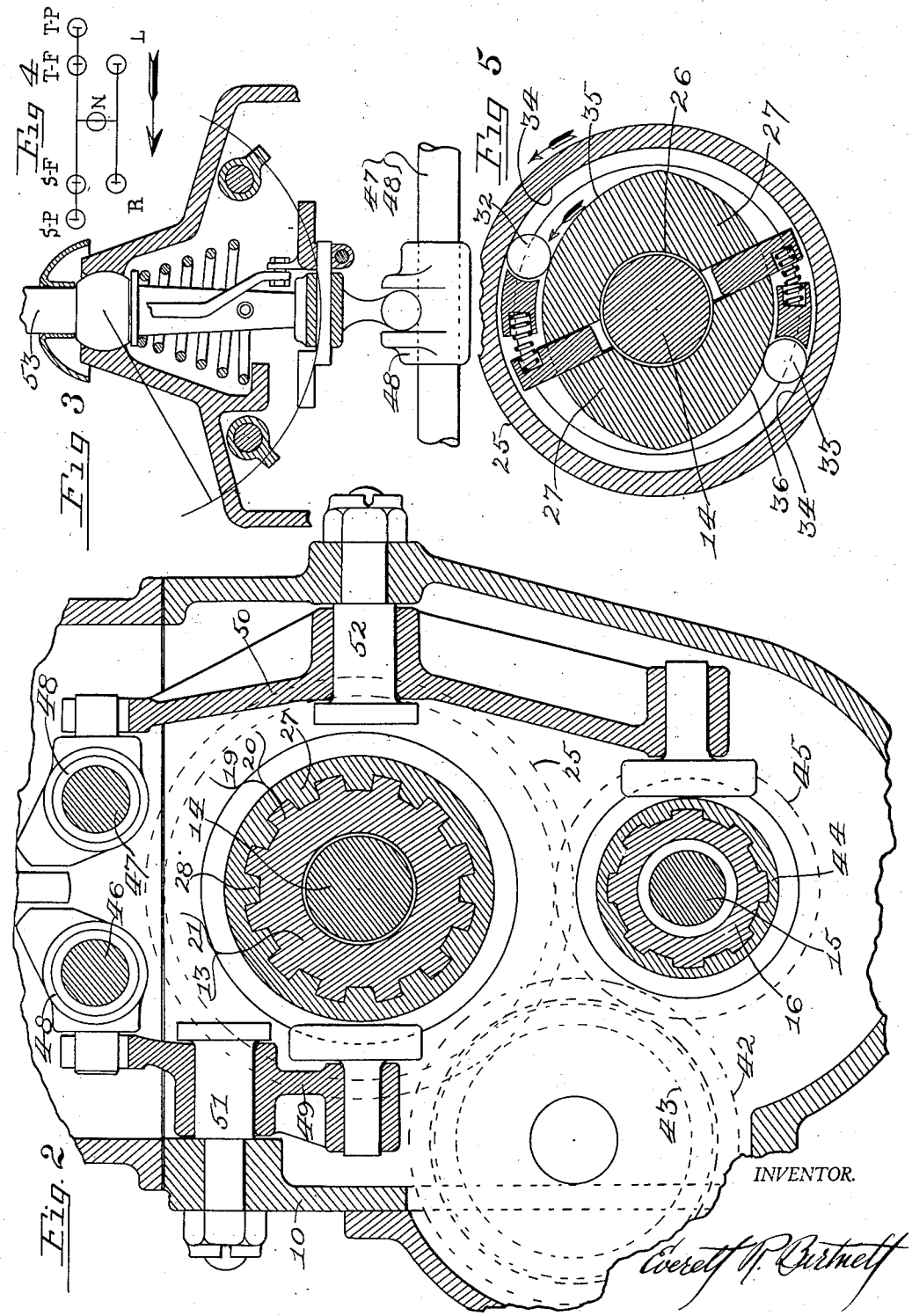

March 21, 1933. E. R. BURTNETT 1,902,618
TRANSMISSION MECHANISM
Filed Jan. 14, 1931 3 Sheets-Sheet 3

INVENTOR
Everett R. Burtnett

Patented Mar. 21, 1933

1,902,618

UNITED STATES PATENT OFFICE

EVERETT R. BURTNETT, OF PASADENA, CALIFORNIA

TRANSMISSION MECHANISM

Application filed January 14, 1931. Serial No. 508,601.

My invention relates to power transmission mechanism for general adaptation, but herein more particularly designed for use in connection with a motor vehicle.

The principal object of the invention is to provide a transmission whereby either a direct drive or a gear drive may be selectively utilized to drive a driven part through a device operating to drive the driven part in one direction and permit over-run of the driven part in the same direction under momentum of the latter, of more compact, rigid and lighter construction and less expensive to manufacture than constructions now in use. It is a further object of the invention, in the obtaining of the above mentioned transmission utility and improvements, to provide a constant mesh gear train driven by the transmission drive shaft with the driven gear element thereof arranged in encircling and rotatable relative relation to the drive shaft, instead of being in encircling relation to the driven shaft, as is the customary practice in transmissions now in use, in combination with a one-way clutching device provided to drive the driven shaft by means transmitting rotation from the driven gear element so arranged to the device. This form, combination and arrangement facilitates the driven shaft being arranged in pilot journal engagement with the drive shaft, if desired, and facilitates a loose intermediary transmission member for selectively coupling the driven gear element or the drive shaft to drive the driven shaft through the one-way driving device, being provided in the form of a single positive clutch, instead of a two piece construction, as is customary in conventional transmissions, and the positive clutch being disposed intermediately of the driven gear element and the drive shaft operatively at one end thereof and the driven shaft one-way driving device operatively at the other end thereof. Which latter form and arrangement accrues both new and advantageous possibilities for design simplification, mechanical improvement and manufacturing cost minimizing in connection with providing free wheeling features in motor vehicle transmission, as compared to practices now in use and constructions constituting the prior art in variable speed ratio one-way driving transmission mechanisms.

Another object of the invention is, to provide for one-way driving a driven shaft by either a direct drive or a constant mesh gear drive, of a form, combination and arrangement facilitating providing for establishing an alternative positive, or sometimes called two-way drive, connection between the selected driver and driven shaft, which may be effected by progressively shifting the drive selector member farther in a given direction secondarily, if desired, after first establishing the one-way drive by a given speed drive.

Aside from the foregoing objects, the invention is designed to facilitate providing a transmission of multi-speed gear drives, in connection with the gear drive having its driven gear element arranged encircling the drive shaft and for driving through driven part one-way driving means, all in one gear box of the shortest possible length.

The invention is described in connection with the accompanying drawings, in which:—

Fig. 2 is a cross section taken on line 2—2 of Fig. 1;

Fig. 3 is a vertical central longitudinal section through the portion of a shift lever and associate mechanism below the fulcrum, of a construction providing latch out stops and optional release mechanism for relative shifting either to obtain free-wheeling, or by continued motion to obtain positive gearing;

Fig. 4 is a diagram of the shifting plan;

Fig. 5 is a cross section taken on line 5—5 of Fig. 1 through the roller ratchet type one-way clutch;

Figure 6:
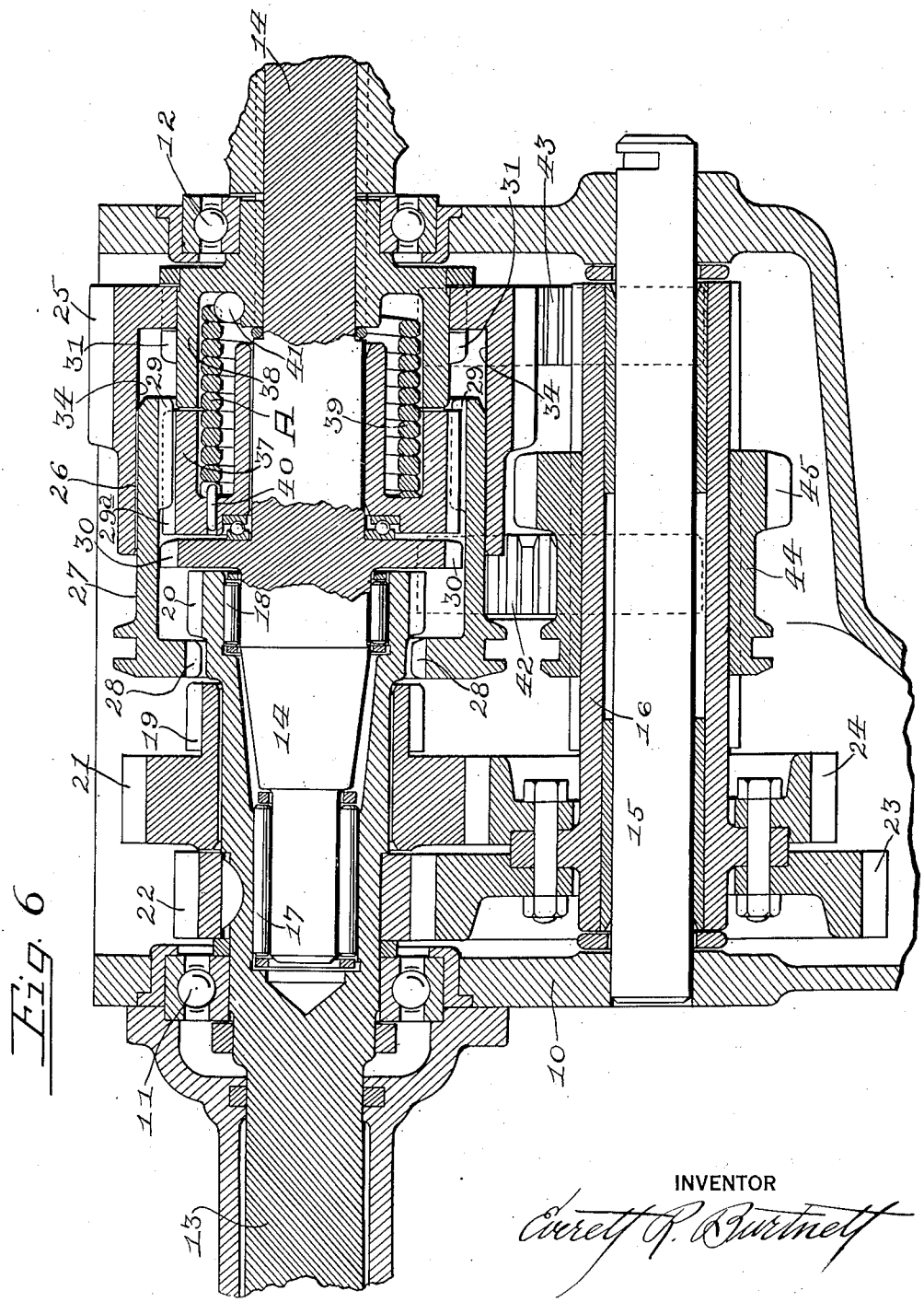
Fig. 6 is a vertical central longitudinal section through my improved transmission, which is modified slightly in construction for use therein of a spring type one-way clutch.

As shown, 10 is a case of the transmission for supporting the bearings 11 and 12, carrying the driving shaft 13 and the driven shaft 14. It also supports a nonrotatable shaft 15 upon which latter a countershaft 16 is rotatively mounted. The driving and driven shafts 13 and 14 are journal engaged by the rollers 17, and the rearwardly extending end of the driving shaft 13 is shown in Fig. 6 being preferably provided with and rotatively supported on the driven shaft 14 by means of rollers 18.

Coincident clutch jaws 19 and 20 are provided respectively on contiguous peripheries of both the driving end of the driving shaft 13 and the contiguous side therewith of a driven gear member 21, the latter being in itself the final driven element of a train of constant mesh gears comprising the other gear members 22, 23 and 24, the former being mounted nonrotatable on the driving shaft 13, the driven member 21 being rotatively mounted on the driving shaft 13 coaxial and in juxtaposition with the driving gear member 24, and the two intermediate members 23 and 24 being fixedly connected coaxial and mounted nonrotatable on the countershaft 16.

A final driven gear member 25 is mounted nonrotatable on the driven shaft 14 and a bearing periphery 26 is provided of the final driven unit, which latter compositely includes both the said driven shaft 14 and the said final driven gear member 25. This bearing periphery 26 is adapted to accommodate a positive clutch 27 being rotatively mounted thereby in journal engagement with the final driven unit, which includes the driven shaft 14 and the final driven gear member 25, and to enable the said clutch 27 being axially moved in such journal engagement.

The clutch jaws 19 and 20 respectively on the driving shaft 13 and the driven gear member 21 are relatively positioned permitting corresponding clutch jaws 28, which are provided on the positive clutch 27, being neutrally disposed intermediate of the respective clutch jaws 19 and 20 of the respective shaft and gear members 13 and 21. The positive clutch 27 is provided with other clutch jaws 29, which are adapted, by reverse axial movements of the clutch 27, to be brought into clutch engagement respectively with corresponding clutch jaws 30 and 31 provided on the final driven unit, the latter consisting of the driven shaft 14 and the final driven gear member 25, and thereof disposed relatively on opposite sides of the clutch 27.

Figure 1:
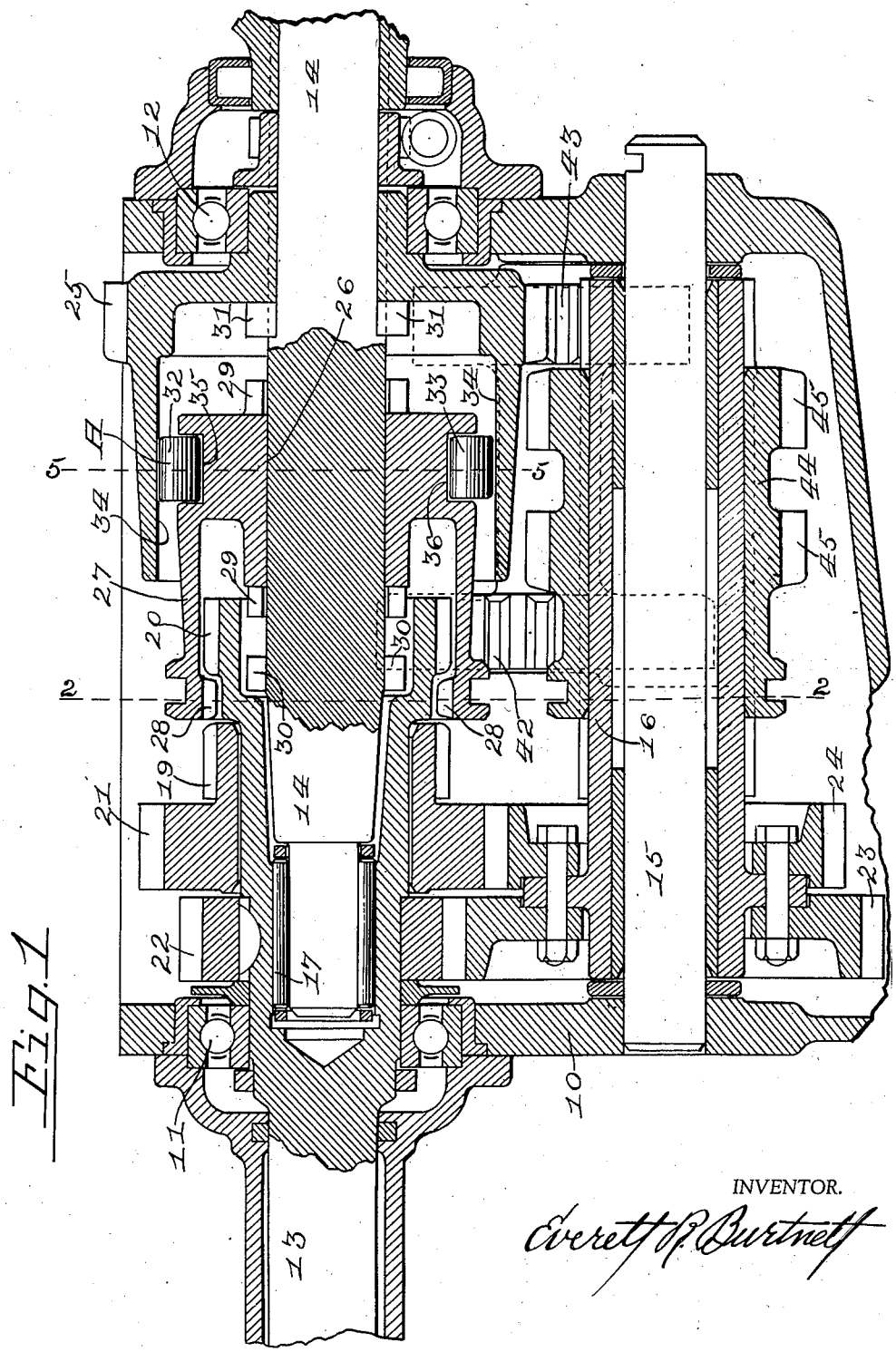
Fig. 1 is a vertical central longitudinal section through my improved transmission, illustrating the construction wherein a roller ratchet type of one-way clutch for free-wheeling is employed.

A one-way clutch A is provided, coacting as a one-way rotary motion transmitting unit between the positive clutch member 27 and the final driven unit, the latter consisting of the driving shaft 14 and the final driven gear member 25. With reference to Fig. 1, the one-way clutch A is provided in the form of rollers 32 and 33 operatively interposed between the the cylinder 34, being a part of the final driven unit, consisting of the driven shaft 14 and the driven gear member 25, and the relatively eccentric peripheries 35 and 36 of the positive clutch member 27, the rotation of which latter member causes the rollers 32 and 33 to be wedged between their respective eccentric peripheries of the positive clutch member 27 and the cylinder 34 of the final driven unit, which latter periphery is relatively concentric with the rotative axis of the positive clutch member 27. With reference to Fig. 6, wherein the use of a spring type one-way clutch A is disclosed, a drive member 37, having corresponding clutch teeth 29ª engaging with the clutch jaws 29 on the positive clutch member 27, is rotatively mounted on the driven shaft 14, and a coaxial driven member 38 which is fixedly connected with the driven gear member 25 is mounted nonrotatable, in common with the driven gear member 25, on the driven shaft 14. A spring 39 is arranged between the ends and within the cylindrical bodies of the respective drive and driven members 37 and 38. A pin 40 is arranged projecting in the face of one end of the spring 39 and a rolling element 41 is arranged engaging the other end of the spring 39, and adapted therewith to effect a wedging action between the spring and the ends respectively of the drive and driven members 37 and 38, and as a consequence, resulting in the spring binding in the cylindrical forms of the respective drive and driven members 37 and 38, when rotary motion is transmitted to the drive member 37 over the driven member 38, and to permit the driven member 38 to overrun the drive member 37, when the speed of the former becomes greater than the latter.

It will be seen, with reference to Figures 1 and 6, respectively illustrating adaptations of roller ratchet and spring types of overrunning clutches in the embodiment of the invention, that the same combination, form and arrangement of change speed gear parts, gear selecting parts and driven transmission parts are employed and are operable with the same relative cooperation.

A pair of coaxial reverse idler gears 42 and 43 are arranged in parallel alignment with the countershaft 16. The driving reverse idler gear member 43 is arranged in constant mesh with the final driven gear member 25, and a shiftable selecting spur gear member 44 is mounted nonrotatable but axially moveable on the countershaft 16 in a position thereon relatively neutrally intermediately disposed between the driven reverse idler gear member 42 and the final driven member 25, whereby the spur dental elements 45 of the shiftable member 44 are adapted, by reverse axial movements on the countershaft 16, respectively to be brought either into engagement with the driven reverse idler gear member 42 or with the final driven gear member 25.

The constant mesh gears 22, 23, 24 and 21 comprise the gearing reduction for the second speed, the power take-off of which is accomplished by bringing the clutch jaws 28 of the axially moveable positive clutch 27 into engagement with the clutch jaws 19 on the driven member 21 of the said gearing. The third speed (direct drive) is accomplished by moving the positive clutch 27 reversely, bringing the clutch jaws 28 thereof into engagement with the clutch jaws 20 on the end of the driving shaft 13. The clutch jaws 19 and 20 respectively on the second speed gearing driven gear member 21 and on the driving shaft member 13 are provided relatively of substantially twice the length of the clutch jaws 28 of the positive clutch member 27 for the purpose of obtaining a double shift range of the positive clutch member 27 in clutch engagement with either the driven gear 21 or with the driving shaft 13, respectively enabling the positive clutch 27 being brought into clutch engagement with the clutch jaws of either the second speed gearing driven gear member 21 or the driving shaft 13 without clutch engagement respectively with the clutch jaws 30 or 31 on the common final driven unit, for the transmission of rotary motion either input to the positive clutch 27 from the second speed gear member 21 or from the direct driving shaft 13, to the final driven unit consisting of the driven shaft 14 and the final driven gear member 25, under free-wheeling conditions by the one way drive of the one-way clutch unit A; or by continued axial movement of the positive clutch member 27, axially moving the jaws 28 thereof into deeper axial relation with either the clutch jaws 19 or 20 respectively on the members 21 and 13, respectively bringing the clutch jaw parts 29 on the positive clutch 27 into engagement, respectively of reverse axial movements, with either the clutch jaws 30 or 31 on the final driven unit comprising the driven shaft 14 and the final driven gear member 25, locking the positive clutch 27 to the final driven member through the respective clutch jaws which are a part thereof. Thus the means is provided and described in my improved transmission for obtaining either third (direct) or second speed gear, each optionally under free-wheeling or positive gearing drive conditions.

The gears 22 and 23 driving the countershaft 16 from the driving shaft 13 and the shiftable pinion 45 on the countershaft 16, when selectively engaged with the driven gear member 25 provide the first speed under positive gearing conditions exclusively. While the same gearing between the driving shaft 13 and the countershaft 16, and the spur pinion 45 when selectively engaged with the reverse idler driven gear member 42, provide reverse drive through the members in their relative order as follows: from the driving shaft 13 to the final driven unit comprising the driven shaft 14 and the final driven gear member 25, through gears 22, 23, the countershaft 16, gears 45, 42, 43 and 25.

Shifting means is provided including sliding bars 46 and 47, each carrying a guide member 48 sleeved over the respective sliding bar and fixedly connected thereon and rocking shifting arms 49 and 50 respectively pivoted on pins 51 and 52 and operatively arranged, the member 49 cooperating with the positive clutch member 27, and the member 50 cooperating with the shiftable member 44.

With the construction as above described the operation is as follows: Whenever the driving shaft 13 is running the countershaft 16 will also be driven through the medium of the constant mesh gear train 22 and 23. The shiftable gear member 44 on the countershaft 16 and the constant mesh train 24 and 21 will also be driven. Therefrom, with the parts in the positions shown in the drawings, the driven shaft 14, the positive clutch 27, the final driven gear 25 and the two coaxial reverse idler gears 42 and 43 remain stationary.

To establish first speed forward drive, the driving gear member 44 is shifted by the operation of the sliding bar 47 and the rocking arm 50 so as to mesh the gear 45 with the driven gear member 25 which will thus establish a motion communication between the driving shaft 13 and the driven shaft 14 through the gears 22, 23, the countershaft 16 and the gears 45 and 25. To establish reverse, the shiftable member 44 is moved reversely on the countershaft 16 by the same shifting means so as to mesh the gear 45 with the reverse idler driven gear member 42 which will thus establish a motion communication for reverse drive between the driving shaft 13 to the driven shaft 14 through the parts 22, 23, 16, 45, 42, 43 and 25.

To establish second speed, the shiftable positive clutch member 27 is shifted by the operation of the sliding bar 46 and the rocking arm 49 so as to clutch couple the positive clutch 27 with the fore portions thereto of the clutch jaws 19 on the driven gear member 21 of the second speed constant mesh train, thus a second speed forward drive communication is established from the driving shaft 13 to the driven shaft 14, under free-wheeling (one way drive) conditions, through the parts of the following order: from the driving shaft 13, through the gears 22, 23, 24, 21 and therefrom through the body of the positive clutch, the transmitting elements of the one-way clutch A, which in the Fig. 1 are the rollers 32 and 33, and in Fig. 6 are the spring parts 39, to the final driven unit comprising the driven shaft 14 and the driven gear member 25. Desiring to supplant the free-wheeling drive of second speed, the positive clutch 27 is shifted in the same direction until the clutch jaws 29 thereof engage the clutch jaws 30 on the final driven unit, which locking results in relative rotation therebetween the positive clutch and the final driven unit being positively prevented and a positive second speed gear being the effect, while the clutch jaws 28 of the positive clutch member 27 are maintained in engagement with those of the driven gear member 21 by axial movement relatively deeper therewith.

To establish third speed (direct drive) under free-wheeling conditions, the positive clutch member 27 is axially moved reversely so as to engage the clutch jaws 28 thereof with the clutch jaws 20 on the driving shaft 13 which will thus communicate motion directly from the driving shaft 13 through the positive clutch member 27 and therefrom through the respective wedging element of the one-way clutch A to the common final driven unit comprising the driven shaft 14 and the final driven gear 25, and to establish the same speed under positive drive conditions axial movement of the positive clutch 27 is continued in the same direction so as to bring the clutch jaws 29 thereon into engagement with the clutch jaws 31 on the final common driven unit comprising the driven shaft 14 and the driven gear 25, whereby the locking of the positive clutch member 27 to the final driven unit supplants the free-wheeling direct drive of the one-way clutch A.

With reference to Fig. 4, the point L indicates the position which the shift lever 53 must be moved to establish first forward speed; the point R to establish reverse; the point S—F to establish second speed under free-wheeling conditions; the point S—P to supplant the free-wheeling second speed drive with the positive gearing second speed drive; the point T—F to establish third speed (direct drive) under free-wheeling conditions; the point T—P to supplant the free-wheeling third speed (direct drive) with the positive third speed (direct drive) gear and the point N to place the gearing in neutral, as it is shown in the drawings.

Thus it will be seen that I have provided a novel and improved change speed transmission gearing combining free-wheeling in the two top speeds under control composite within the shifting control of the standard shift plan and rendering positive gearing optional in the respective free-wheeling speeds, which construction is comparatively short, light in weight, with novel adaptable construction enabling the use of various types of one-way clutch devices, and comparatively inexpensive of production.

What I claim as my invention is:

1. In a transmission of the character described, a drive shaft, a pinion fixed to the said drive shaft, clutch teeth on the driving end of said drive shaft, a driven gear loose on said drive shaft and positioned thereon intermediately of the said pinion and clutch teeth, clutch teeth on said driven gear adjacent those on the drive shaft, means including gears in constant mesh operatively connecting the said driven gear to the said drive shaft whereby said driven gear may be rotated at a different speed than the drive shaft, a driven shaft in axial alignment and in journal engagement with the drive shaft, a member having a bell shaped portion fixed to the driven shaft, a shiftable positive clutch mounted rotatable on the driven shaft, recesses in the periphery of said positive clutch, roller clutch members in the recesses, said bell shaped portion of the member fixed to the driven shaft having a cylindrical bore, said bore being adapted to act as a race for the said roller clutch members, said roller clutch members being adapted to be slid with the axial movements of the shiftable positive clutch to and fro in the bore of the said bell shaped portion, said positive clutch having a bell shaped portion encompassing the driving end of the drive shaft, clutch teeth on the end of said bell shaped portion adapted to be alternatively brought into engagement with the clutch teeth on the drive shaft and driven gear thereon, two series of clutch jaws on the driven shaft, one series on each side of the positive clutch, clutch jaws on the positive clutch adapted to be alternatively brought into engagement with the two series of clutch jaws on the driven shaft, means to shift said positive clutch reversely to alternatingly connect the drive shaft and driven gear member thereon therewith to drive the driven shaft at the respective differentiating speeds through the one way clutch, and means to shift the positive clutch continuously in either direction for making a positive connection between said positive clutch and driven shaft members for either direct or gear drive.

2. In a transmission of the character described, a driven member having a shaft portion and a bell shaped portion, a shiftable positive clutch rotatably mounted on said shaft portion, recesses in the periphery of the positive clutch, roller clutch members in the recesses and engaging said bell shaped portion for transmitting rotation one way between said positive clutch and driven members, said roller clutch members adapted to be slid longitudinally in the said bell shaped portion subsequent to axial movements of said positive clutch, clutch jaws on the positive clutch, two series of clutch jaws on the said driven member, one series on each side of the positive clutch, said two series of clutch jaws being adapted to be alternatively engaged by the clutch jaws on the positive clutch, two driving members adapted to rotate at different speeds, means operatively connecting said driving members, one of the two driving members being concentrically arranged over the other, clutch jaws provided on contiguous portions of both the said driving members and on ends thereof which are coincident with the said driven member, said positive clutch having a bell shaped portion encompassing the inner one of the two driving members, clutch jaws on the end of said bell shaped portion adapted to be alternatively brought into engagement with the clutch jaws on the two driving members, and means to shift the positive clutch reversely, respectively successively in two stages, firstly to connect either of the two driving members for driving the driven member one way through the said roller clutch members at the speed of the respective driving member, which is optionally engaged, and secondly to positively connect the positive clutch to the driven member for driving the said driven member with positive gear at the speed of the respective driving member.

3. A change speed transmission comprising a drive shaft, a gearing driven member freely mounted on said drive shaft, means connecting said driven gear member to said drive shaft for driving said driven gear member at a different speed than the said drive shaft, said drive shaft having a driving end portion projecting beyond said driven gear member, said projecting end portion of said drive shaft having a clutch toothed periphery, said driven gear member having a clutch toothed periphery portion adjacent the clutch toothed periphery of said drive shaft, a driven member in axial alignment and in journal engagement with said drive shaft, a shiftable positive clutch mounted rotatable on said driven member, said positive clutch having a bell shaped portion encompassing the driving end of the said drive shaft, clutch teeth on the bell shaped portion of said positive clutch adapted to be alternatively brought into engagement with the clutch teeth on said drive shaft and driven gear member thereon, two series of clutch teeth on the said driven member one series on each side of the said positive clutch, other clutch teeth on the said positive clutch adapted to be alternatively brought into engagement with the said two series of clutch teeth on the said driven member, a one way clutch operatively interposed between the said positive clutch and the said driven member, means to shift said positive clutch to engage either the said drive shaft or the driven gear member, respectively, for either direct driving or gear driving the said driven member one way through the said one way clutch, and means to shift said positive clutch to make positive connections between said positive clutch and driven member for either direct or gear drive.

4. In a change speed transmission, a drive shaft, a driven shaft in axial alignment therewith, a countershaft parallel to said drive and driven shafts, a gear fixed to said drive shaft, a gear fixed to said countershaft and in constant mesh with said gear which is fixed on said drive shaft, a second gear fixed to said countershaft, a second gear freely mounted on said drive shaft and in constant mesh with the said second gear on said countershaft, a driven member having a bell shaped portion fixed to said driven shaft, a gear mounted nonrotatable on said driven member, a third gear mounted nonrotatable on said countershaft adapted to be engaged with the gear on said driven member, clutch teeth on the driving end of the said drive shaft, clutch teeth on the coincident side of the said second gear which is freely mounted on said drive shaft, a positive clutch having a bell shaped portion encompassing the driving end of said drive shaft rotatably and axially movably mounted on the said driven member, clutch teeth on the said bell shaped portion of the positive clutch to be brought into engagement alternatively with the clutch teeth on the said drive shaft and on the gear which is freely mounted on the said drive shaft, a one way clutch operatively interposed between the said positive clutch and the said driven member for transmitting rotary motion one way between said positive clutch and the said driven member, and said positive clutch and driven member each having parts to be engaged, by axial movement of the said clutch in either direction, for positively preventing relative rotation therebetween.

5. A change speed transmission comprising a drive shaft, a final driven member in axial alignment therewith, a countershaft parallel to said drive and driven members, a drive gear fixed to said drive shaft, a gear fixed to said countershaft and in constant mesh with said drive gear, a driven gear rotatively sleeved on said drive shaft, a second gear fixed to said countershaft and in constant mesh with said driven gear, clutch teeth on the driving end of said drive shaft, clutch teeth on the coincident side of the said driven gear, a final driven gear fixed to said final driven member, a third gear splined to said countershaft to be shifted into mesh with the said final driven gear, said final driven gear having a bell shaped portion extending toward the said drive shaft, a shiftable positive clutch having a bell shaped portion encompassing the driving end of said driving shaft mounted rotatable on the said final driven member, clutch teeth on the bell shaped portion of said positive clutch neutrally disposed intermediately of the clutch teeth on said drive shaft and the driven gear thereon, said clutch teeth on the bell shaped portion of the positive clutch being adapted to be alternately engaged with the clutch teeth on said drive shaft and driven gear, said positive clutch having parts and said final driven member having two series of parts to be engaged to positively prevent relative rotation therebetween, a one way clutch operatively interposed between said positive clutch and final driven member, means to shift said positive clutch to engage the clutch teeth on the said drive shaft for direct driving the said final driven gear through the one way clutch and means whereby said positive clutch may be continuously shifted in the same direction to engage one series of parts on the final driven member to be engaged for positively gearing the said final driven member to the said drive shaft, means to shift said positive clutch to engage the clutch teeth on the said driven gear for gearing driving the said final driven member through the one way clutch and means whereby said positive clutch may be continuously shifted in the same direction to engage the other series of parts on the said final driven member to be engaged for positively gearing the said final driven member to the said driven gear, and means to shift the said third gear on the countershaft to engage the said final driven gear which is fixed on the said final driven member.

6. In a change speed transmission mechanism, in combination, axially aligned drive and driven shafts in journal engagement with each other, a final driven member mounted nonrotatable on the driven shaft, said driven member having a bell shaped portion extending toward the drive shaft member and encompassing the driven shaft member, said driven member and driven shaft comprising a common driven unit, a shiftable positive clutch member mounted for rotation and axial movement relative to said common driven unit and disposed in concentric relation thereto with its driving end occupying the annular recess between the bell shaped and shaft portions of said common driven unit, a one way clutch operatively interposed between the said positive clutch member and the said common driven unit, the positive clutch member and the common driven unit each having parts to be engaged to positively prevent relative rotation therebetween, said parts to be engaged of the common driven unit being positioned thereon whereby they may be alternatively engaged by the said parts to be engaged on the said positive clutch member by reverse axial movements of said clutch member, said positive clutch member having a bell shaped portion extending toward the drive shaft and encompassing said shaft member, a series of clutch jaws provided on the outer end of the bell portion of said positive clutch, a reduction gearing, the final driven member of said gearing being arranged concentrically encompassing the said drive shaft and revolvable independently thereof, drive and intermediate connecting gears between said drive shaft and final driven gear member, the said final driven gear member being arranged on the same side of the said positive clutch member with the said drive shaft, the said drive shaft and final driven gear members each having a peripherial clutch jawed portion, relatively positioned of each member, so as the clutch jawed portions of the two members are coincident and in close proximity with each other, the said positive clutch member being arranged so as the clutch jaws thereon are neutrally disposed intermediately of the clutch jaws of the said drive shaft and final drive gear members, means to shift the positive clutch member to connect the drive shaft for direct driving the common driven unit through the one way clutch, and means whereby the said positive clutch may be shifted continuously thereafter in the same direction to positively connect the said positive clutch to the common driven unit; and means to shift the said positive clutch reversely to connect the said final driven gear member for gear driving the common driven unit at reduced speed through the one way clutch, and means whereby the said positive clutch may be shifted continuously thereafter in the same direction to positively connect the said positive clutch to the common drive.

7. In motor vehicle transmission, the combination of, a two speed driving unit comprising a drive shaft, a drive gear fixed on said drive shaft intermediate its ends, a driven gear rotatably mounted on said drive shaft intermediate said drive gear thereon and the driving end of said drive shaft, means connecting said driven gear to said drive shaft for continuously rotating said driven gear from said drive shaft in the same direction as, but at a different speed than, said drive shaft, and said drive shaft and driven gear each having clutch teeth rendering each positively engageable; and an alternative overrunning or positive drive coupling and transmission unit comprising a final driven transmission member aligned with the drive shaft of said driving unit, a shiftable intermediate transmission member mounted for rotation and axial movement relative to said driven transmission member and in encircling relation thereto, clutch teeth on said intermediate transmisison member adapted to be selectively engaged with the clutch teeth on one of said drive shaft and driven gear members of said driving unit, an overrunning clutch operatively interposed between said intermediate transmission member and final driven transmission member for driving said final transmission member from said intermediate transmission member in one direction and permitting said final driven transmission member to over-run said intermediate transmission member in the same direction under momentum of the latter, means to shift said intermediate transmission member into engagement, either with the drive shaft, or with the driven gear member of said driving unit, and means for positively coupling said intermediate transmission member to said final transmission member.

8. In combination, two concentric driving members, transmitting means for rotating the outer one of said two driving members from the inner one in the same direction as, but at a different speed than, said inner one, a transmission member in axial alignment with said driving members, an overrunning clutch member mounted on said transmission member and adapted to inpart rotation in one direction thereto, said overrunning clutch being disposed relatively beyond said two concentric driving members, means for selectively coupling one of said two driving members and the said transmission member together through said overrunning clutch, and means for optionally positively coupling the selected driving member and the transmission member together thereafter.

9. In selective overruning or positive drive transmission mechanism, in combination, a main transmission member formed in two aligned and continuously related parts comprising a drive part and a driven part, a driven gear member rotatively sleeved on said drive shaft part, means for driving said gear member from said drive shaft part at low speed relative to the latter, means for selectively coupling either said gear member or said drive shaft part to said driven shaft part, said means including a drive selecting element engageable selectively with either said drive shaft or driven gear member and a device through the medium of which latter said driven shaft part is operated in one direction and permitting over-run of said driven shaft part in the same direction under momentum of the latter, a driving part of said device, means for optionally positively coupling the drive selecting element of said second-named means and said driven shaft part together so that relative rotation between the selected driver and said driven shaft part will be positively prevented, and means operating independently of said device for driving said driven shaft part from said drive shaft part in a reverse direction.

10. In combination, a drive shaft, a driven shaft in aligned and contiguous relation thereto, a gear rotatable on said drive shaft, means for driving said gear from said drive shaft at a different speed relative to the latter, an overrunning clutch for inputting rotation in one direction to said driven shaft and permit over-run of said driven shaft in the same direction under momentum of the latter, a driving part of said overrunning clutch, means for positively coupling said clutch driving part selectively either to said drive shaft or gear, means for optionally positively coupling said clutch driving part and driven shaft together, and means operating independently of said overrunning clutch for driving said driven shaft from said drive shaft in a reverse direction.

11. In motor vehicle transmission, in combination, a drive shaft, a driven shaft for positive drive connection with the vehicle wheels and in contiguously aligned and direct coupling relation to said drive shaft, a countershaft parallel to said drive and driven shafts, means for driving said countershaft from said drive shaft, a gear rotatively sleeved on said drive shaft and in constant geared connection with said countershaft, an overrunning clutch operating to drive said driven shaft in one direction and permit over-run of said driven shaft in the same direction under momentum of the latter, a member operating as a driving element of said overrunning clutch, means for selectively positively coupling said clutch driving element either to said drive shaft or said gear, means for optionally positively coupling said clutch driving element and driven shaft together so that relative rotation therebetween will be positively prevented, a reverse driven gear fixed on said driven shaft, an idler gear in constant mesh with said driven gear, a drive gear mounted nonrotatable but axially movable on said countershaft, said dive gear being adapted to be brought into engagement with said idler gear for connecting the transmission train between said drive and driven shafts to drive said driven shaft from said drive shaft in a reverse direction.

12. In combination, a pair of concentric driving members, means for driving the outer one of said driving members from the inner one at a different speed relative to the latter, a final driven member in contiguously aligned relation to the inner one of said two driving members, a ring in encircling and rotatably independent relation to said final driven member, means for positively coupling said ring selectively to one of said two driving members, means actuated by said ring operating to drive said final driven member in one direction and permit over-run of said final driven member in the same direction under momentum of the latter, means for optionally positively coupling said ring and final driven member together to supplant the one-way drive medium of said third-named means therebetween with a positive couple.

13. In combination, a main transmission shaft formed in two aligned and contiguously related parts comprising a drive part and a driven part, a driven gear member rotatably mounted on said drive shaft part and in geared connection with the latter, a ring in encircling and loose relation relative to said driven shaft part, means for positively coupling said ring selectively to either said driving shaft part or said driven gear member, means actuated by said ring operating to drive said driven shaft part in one direction and permit over-run of said driven shaft part in the same direction under momentum of the latter, means for positively coupling said ring and driven shaft part together, and means operating independently of said second-named means for driving said driven shaft part from said drive shaft part in a reverse direction.

14. In a motor vehicle transmission, a drive shaft driven by the vehicle engine, a reduced speed gear driven by said drive shaft rotatably mounted on said shaft, a driven shaft aligned and in contiguous relation to said drive shaft, a sleeve mounted rotatable relative and in encircling relation to said driven shaft, an overrunning clutch connecting said sleeve and driven shaft, and coacting clutch teeth on said drive shaft and gear and sleeve in positions so that said sleeve may be shifted into positive engagement selectively with either said drive shaft or gear.

15. In a motor vehicle transmission, a drive shaft driven by the vehicle engine, a reduced speed gear driven by said drive shaft rotatably mounted on said shaft, a driven shaft aligned and in contiguous relation to said drive shaft, a sleeve mounted rotatable relative and in encircling relation to said driven shaft, an overrunning clutch connecting said sleeve and driven shaft, and coacting clutch teeth on said drive shaft and gear and sleeve in positions so that said sleeve may be shifted into positive engagement selectively with either said drive shaft or gear, and means for optionally effecting a positive driving connection between said sleeve and driven shaft.

16. In a motor vehicle transmission, a drive shaft driven by the vehicle engine, a driven shaft aligned and in journal engagement with said drive shaft, means for driving said driven shaft from said drive shaft at the same speed as, or at different speed than, said drive shaft, said means including a reduced speed gear rotatably mounted on said drive shaft and driven therefrom, a positive clutch mounted rotatable relative to and encircling said driven shaft for positive engagement alternatively with said drive shaft and gear and a device operatively connecting said clutch and driven shaft through the medium of which said driven shaft is operated in one direction and permitting over-run of said driven shaft in the same direction under momentum of the latter when being driven either at the same speed as, or at a different speed than said drive shaft.

17. In a motor vehicle transmission, the combination of a drive shaft driven by the vehicle engine, a driven shaft aligned and in contiguous relation to said drive shaft, means for driving said driven shaft from said drive shaft at the same speed as, or at different speed than, said drive shaft selectively under conditions either permitting over-run or preventing over-run of said driven shaft, said means including a reduced speed effected gear rotatably mounted on said drive shaft and driven therefrom, a positive clutch mounted rotatable relative to said drive and driven shafts for positive engagement alternatively with said drive shaft and gear, a device operatively connecting said clutch and driven shaft through the medium of which said driven shaft is operated in one direction and permitting over-run of said driven shaft in the same direction under momentum of the latter when being driven either at the same speed as, or at different speed than, said drive shaft, and means for optionally supplanting the one-way drive connection of said device between said clutch and driven shaft with a positive drive connection.

18. In transmission mechanism, the combination of a drive shaft, a driven shaft in alignment with said drive shaft, a device operating to drive said driven shaft in one direction and permit over-run of said driven shaft in the same direction under momentum of the latter, and means for driving said driven shaft from said drive shaft through the medium of said device at a different speed than said drive shaft, including a gear train, the driven gear element of said gear train being in encircling and rotatable relative relation to said drive shaft.

19. In transmission mechanism which includes aligned drive and driven shafts, the combination of a gear train driven by said drive shaft, the driven gear element of said gear train being rotatably mounted on said drive shaft; with a device operating to drive said driven shaft in one direction and permit over-run of said driven shaft in the same direction under momentum of the latter; and means for selectively coupling either said driven gear element or said drive shaft to drive said driven shaft through said device.

20. In a variable speed ratio motor vehicle transmission mechanism composed of a drive shaft, a driven shaft aligned therewith and at least one constant meshing speed reducing gear train driven by said drive shaft the driven gear element of which is coaxial with said drive and driven shafts; the positioning of said driven gear element of said constant meshing gear train in encircling and rotatable relative relation to said drive shaft in combination with an overrunning clutch provided to drive said driven shaft in one direction, and means in encircling and rotatable relative relation to said driven shaft and disposed longitudinally intermediately of said drive shaft and driven gear element operatively at one end thereof and said overruning clutch operatively at the other end thereof for selectively coupling either said drive shaft or said driven gear element to drive said overruning clutch.

In testimony whereof I affix my signature.

EVERETT R. BURTNETT.